N. T. REMY.
Wheel-Cultivator.
No. 211,786.  Patented Jan. 28, 1879.
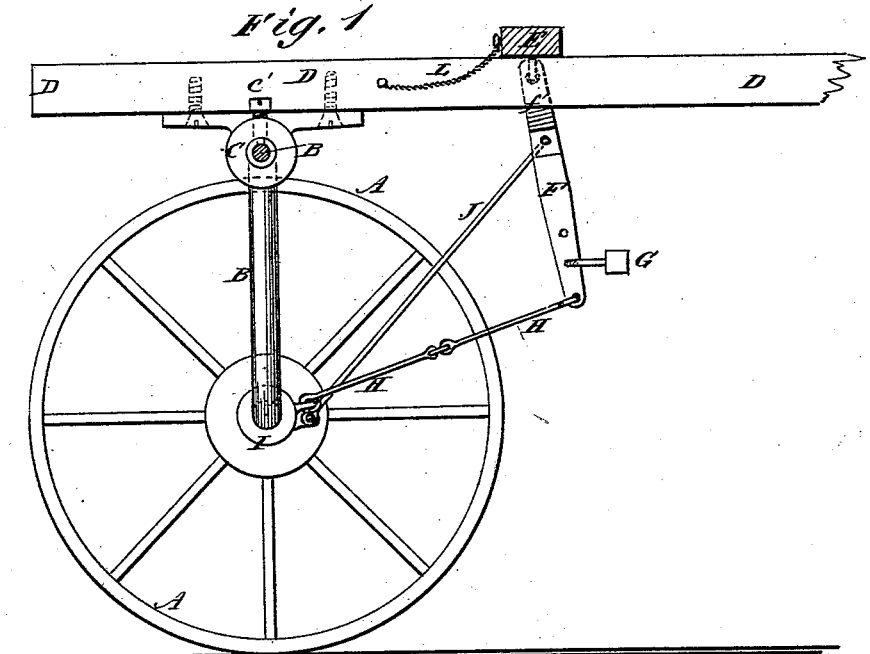
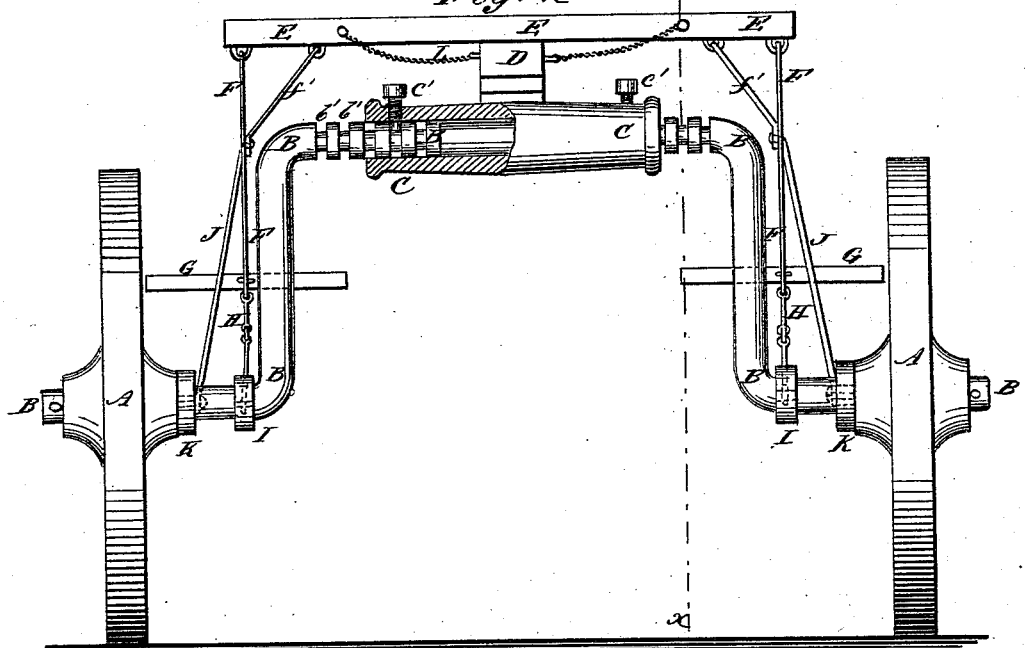
WITNESSES:
C. Neveux
C. Sedgwick
INVENTOR:
N. T. Remy
BY Munn & Co
ATTORNEYS.

UNITED STATES PATENT OFFICE.

NOAH T. REMY, OF BROOKVILLE, INDIANA.

IMPROVEMENT IN WHEEL-CULTIVATORS.

Specification forming part of Letters Patent No. 211,786, dated January 28, 1879; application filed May 31, 1878.

*To all whom it may concern:*

Be it known that I, NOAH T. REMY, of Brookville, in the county of Franklin and State of Indiana, have invented a new and useful Improvement in Wheel-Cultivators, of which the following is a specification:

Figure 1 is a vertical longitudinal section of a part of a wheel-cultivator illustrating my invention, taken through the line $x\ x$, Fig. 2. Fig. 2 is a rear view of the same, part being broken away to show the construction.

Similar letters of reference indicate corresponding parts.

The object of this invention is to furnish wheel-cultivators which shall be so constructed that they may be conveniently adjusted at any desired width, and which will allow either horse to draw his part of the machine forward in advance of the other without throwing the machine out of line with the row, and which at the same time shall be simple in construction, conveniently adjusted, and reliable in use.

A are the wheels, which revolve upon the journals of the axles B, both of which are bent twice at right angles, giving them the crank form.

The upper ends or shanks of the axle B enter the cavity of the hollow cylinder C, so that the wheels may be adjusted at any desired distance apart by sliding the shanks of the crank-axle B into and out of the sockets of the cylinder C.

Around the shanks of the crank-axle B are formed a number of ring-grooves, $b'$, to receive the ends of set-screws $c'$, passing in through the sides of the socket-cylinder C, so as to prevent the said crank-axle from moving inward or outward after they have been adjusted, while allowing them to turn freely within said sockets.

The socket-cylinder C is securely and rigidly attached at its middle part to the tongue D, to which, at a suitable distance in front of the said socket-cylinder, is pivoted a double-tree, E.

To the lower sides of the ends of the double-tree E is hinged the upper end of the draw-bars F, to the lower part of which the whiffle-trees G are attached, several holes being formed in the lower part of the said draw-bars F to receive the said whiffletrees G, so that the height of the draft-point may be adjusted as required.

To the upper part of the inner sides of the draw-bars F are secured the lower ends of the short inclined brace-bars $f'$, the upper ends of which are hinged to the lower side of the double-tree E, at a little distance from its ends. The braces $f'$ prevent the draw-bars F from having a lateral movement, but allow their lower ends to swing forward and backward freely.

To the lower ends of the draw-bars F are attached the forward ends of the jointed draw-rods or chains H, the rear ends of which are connected with the axle-arms of the crank-axle B by a collar, I, or other suitable means.

To the upper part of the draw-bars F are attached the forward ends of the draw-braces J, the rear ends of which are connected with the axle-arms of the crank-axle B by collars K, or other suitable means. The brace-rods J prevent either axle-arm from being drawn too far forward, while allowing it to move forward and back within suitable limits independent of the other axle-arm.

The movement of the double-tree E upon its pivot is limited by stop-chains L, the outer ends of which are attached to the side of the said double-tree, and their inner ends are attached to the opposite sides of the tongue D.

If desired, instead of the stop-chains L, a casting may be used, so formed as to overlap the upper side of the middle part of the double-tree E and serve as a hammer-strap, and which is made with inclined edges or shoulders for the rear side of the double-tree to strike against when either end is turned too far back.

Having thus described my invention, I claim as new and desire to secure by Letters Patent—

1. The extensible crank-axles B, having ring-grooves $b'$, in combination with the cylinder C, attached to tongue D, and the set-screws $c'$, as and for the purpose described.

2. The combination of the sectional axle B, cylinder C, tongue D, evener E, hangers F, links H, and brace-rods J, substantially as shown and described.

NOAH TOWNER REMY.

Witnesses:
    J. B. PRICE,
    D. V. JOHNSTON.